United States Patent
Sprouse et al.

(10) Patent No.: US 6,775,987 B2
(45) Date of Patent: Aug. 17, 2004

(54) LOW-EMISSION, STAGED-COMBUSTION POWER GENERATION

(75) Inventors: Kenneth M. Sprouse, Northridge, CA (US); James A. Hartung, West Hills, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/242,715

(22) Filed: Sep. 12, 2002

(65) Prior Publication Data

US 2004/0050067 A1 Mar. 18, 2004

(51) Int. Cl.⁷ .................................................. F02C 6/00
(52) U.S. Cl. ............................ 60/774; 60/775; 60/791
(58) Field of Search ....................... 60/774, 775, 39.15, 60/39.12, 39.17, 39.53, 39.55, 39.5, 39.52, 722, 791, 730

(56) References Cited

U.S. PATENT DOCUMENTS

| | | |
|---|---|---|
| 2,636,778 A | 4/1953 | Michelsen |
| 2,785,926 A | 3/1957 | Lataste |
| 2,857,204 A | 10/1958 | Gross |
| 2,930,532 A | 3/1960 | Johnson |
| 3,056,559 A | 10/1962 | Orr |
| 3,093,315 A | 6/1963 | Tachiki et al. |
| 3,121,639 A | 2/1964 | Bauer et al. |
| 3,430,863 A | 3/1969 | Canavan et al. |
| 3,610,537 A | 10/1971 | Nakagawa et al. |
| 3,779,212 A | 12/1973 | Wagner |
| 3,837,788 A | 9/1974 | Craig et al. |
| 3,850,569 A | 11/1974 | Alquist |
| 3,923,011 A | 12/1975 | Pfefferle |
| 3,928,961 A | 12/1975 | Pfefferle |
| 4,021,186 A | 5/1977 | Tenner |
| 4,021,188 A | 5/1977 | Yamagishi et al. |
| 4,054,407 A | 10/1977 | Carrubba et al. |
| 4,102,125 A | 7/1978 | Schelp |
| 4,173,118 A | 11/1979 | Kawaguchi |
| 4,185,456 A | * 1/1980 | Cummings ................... 60/780 |
| 4,216,908 A | 8/1980 | Sakurai et al. |
| 4,271,664 A | 6/1981 | Earnest |
| 4,288,408 A | 9/1981 | Guth et al. |

(List continued on next page.)

FOREIGN PATENT DOCUMENTS

WO    WO 00/43712    7/2000

OTHER PUBLICATIONS

O. Bolland and S. Saether, New Concepts For Natural Gas Fired Power Plants Which Simplify The Recovery Of Carbon Dioxide; Energy Convers. Mgmt, 1992, pp. 467–475, vol. 33, No. 5–8, Pergamon Press Ltd. Great Britain.

Olav Bolland and Philippe Mathieu, Comparison Of Two $CO_2$ Removal Options In Combined Cycle Power Plants, Energy Convers. Mgmt, 1998, pp. 1653–1663, vol. 39, No. 16–18, Elsevier Science Ltd. Great Britain.

*Primary Examiner*—Justine R. Yu
*Assistant Examiner*—William H. Rodriquez
(74) *Attorney, Agent, or Firm*—Alston & Bird LLP

(57) ABSTRACT

There is provided a low-emission, staged-combustion power generation system and associated method for generating power. The power generation system and method combust a carbonaceous fuel with an oxidizing fluid, both of which are substantially free of nitrogen and sulfur, to generate power, for example, in the form of electricity, without the formation of nitrous oxides (NOx) and sulfur oxides (SOx). Efficiency is enhanced using a multi-staged combustion, in which the carbonaceous fuel is partially combusted before passing through a first power take-off device and subsequently reheated and passed through one or more additional power take-off devices. Additionally, exhaust gases from one or more of the power take-off devices can be extracted and processed to provide quantities of useful products such as hydrogen and methanol.

44 Claims, 5 Drawing Sheets

U.S. PATENT DOCUMENTS

| | | | |
|---|---|---|---|
| 4,297,093 A | 10/1981 | Morimoto et al. | |
| 4,316,580 A | 2/1982 | Bodai | |
| 4,356,698 A | 11/1982 | Chamberlain | |
| 4,407,450 A | 10/1983 | Chegolya et al. | |
| 4,504,211 A | 3/1985 | Beardmore | |
| 4,575,332 A | 3/1986 | Oppenberg et al. | |
| 4,773,596 A | 9/1988 | Wright et al. | |
| 4,783,008 A | 11/1988 | Ikeuchi et al. | |
| 4,784,600 A | 11/1988 | Moreno | |
| 4,801,092 A | 1/1989 | Webber et al. | |
| 4,893,468 A | 1/1990 | Hines | |
| 4,912,931 A | 4/1990 | Joshi et al. | |
| 4,936,088 A | 6/1990 | Bell | |
| 4,955,191 A | 9/1990 | Okamoto et al. | |
| 4,958,488 A | 9/1990 | Wilkes et al. | |
| 4,989,549 A | 2/1991 | Korenberg | |
| 5,025,631 A | 6/1991 | Garbo | |
| 5,029,557 A | 7/1991 | Korenberg | |
| 5,103,630 A | 4/1992 | Correa | |
| 5,158,445 A | 10/1992 | Khinkis | |
| 5,161,379 A | 11/1992 | Jones et al. | |
| 5,224,333 A | 7/1993 | Bretz et al. | |
| 5,247,791 A | 9/1993 | Pak et al. | |
| 5,259,184 A | 11/1993 | Borkowicz et al. | |
| 5,285,628 A | 2/1994 | Korenberg | |
| 5,288,021 A | 2/1994 | Sood et al. | |
| RE35,061 E | 10/1995 | Correa | |
| 5,462,430 A | 10/1995 | Khinkis | |
| 5,467,926 A | 11/1995 | Idleman et al. | |
| 5,675,971 A | 10/1997 | Angel et al. | |
| 5,680,765 A | 10/1997 | Choi et al. | |
| 5,680,766 A | 10/1997 | Joshi et al. | |
| 5,709,077 A | 1/1998 | Beichel | |
| 5,713,205 A | 2/1998 | Sciocchetti et al. | |
| 5,715,673 A | 2/1998 | Beichel | |
| 5,743,081 A | 4/1998 | Reynolds | |
| 5,778,676 A | 7/1998 | Joshi et al. | |
| 5,833,141 A | 11/1998 | Bechtel, II et al. | |
| 5,894,720 A | 4/1999 | Willis et al. | |
| 5,906,094 A | 5/1999 | Yang et al. | |
| 5,906,806 A | 5/1999 | Clark | |
| 5,934,064 A | 8/1999 | Newby et al. | |
| 5,950,417 A | 9/1999 | Robertson, Jr. et al. | |
| 5,956,937 A | 9/1999 | Beichel | |
| 5,966,937 A | 10/1999 | Graves | |
| 5,970,702 A | 10/1999 | Beichel | |
| 6,065,281 A | 5/2000 | Shekleton et al. | |
| 6,076,745 A | 6/2000 | Primdahl | |
| 6,082,112 A | 7/2000 | Shekleton | |
| 6,148,602 A | 11/2000 | Demetri | |
| 6,162,266 A | 12/2000 | Wallace et al. | |
| 6,170,264 B1 | 1/2001 | Viteri et al. | |
| 6,206,684 B1 | 3/2001 | Mueggenburg | |
| 6,216,436 B1 * | 4/2001 | Ranasinghe et al. | 60/781 |
| 6,637,183 B2 * | 10/2003 | Viteri et al. | 60/39.182 |
| 2001/0015061 A1 * | 8/2001 | Viteri et al. | 60/39.161 |

* cited by examiner

LOW-EMISSION, STAGED-COMBUSTION POWER GENERATION

BACKGROUND OF THE INVENTION

1) Field of the Invention

This invention relates generally to apparatuses and methods for combusting carbonaceous fuels to generate power and more specifically to such apparatuses and methods for increasing efficiency and reducing pollutant combustion products, such as NOx and SOx.

2) Description of Related Art

The combustion of carbon-based compounds, or carbonaceous fuels, is widely used for power generation. In one typical generation system, a carbonaceous fuel, such as natural gas, is mixed with air and combusted in a combustion chamber. The resulting combusted gas is discharged to, and used to rotate, a turbine, which is mechanically coupled to an electric generator. Each system is characterized by a plant net thermal efficiency, or range of plant net thermal efficiency, which is computed according to a ratio of the net useful energy to the thermal energy of combustion. The net useful energy is the useful energy output, e.g. electricity, less the energy inputs, such as the energy required to power the pumps, compressors, and the like. The thermal energy of combustion is the thermal energy generated by the combustion of the combustion fuel.

The carbonaceous fuel used for combustion often includes nitrogen and/or sulfur, which can occur individually or in compounds. Nitrogen is also a major component of the air used for combustion. Thus, the typical combustion process combusts nitrogen and/or sulfur and generates one or more nitrous oxides, collectively referred to as NOx, and sulfur oxides, collectively referred to as SOx. NOx and SOx formed as products of combustion are a major source of atmospheric pollution, and the reduction of these pollutants has been recognized as an important task.

A number of techniques and devices have been employed to prevent the production or discharge of such pollutants during power generation. For example, some final exhaust gases are passed through filters, scrubbers, or converters. Such devices remove some of the pollutants, but the devices are expensive and may reduce the efficiency of the generation process. Also, these devices are not completely effective, so some of the pollutants pass through these devices and reach the atmosphere.

The formation of NOx is significantly reduced by limiting the combustion temperature to below about 2780° F. Therefore, one proposed solution to minimize the production of NOx is to limit the temperature of the fuel during combustion. The combustion temperature can be reduced by injecting water or steam into the combustion chamber to cool the gases. However, high temperatures typically still result in localized regions of the combustion chamber, and NOx thus results. Additionally, some NOx is produced even at lower temperatures. Thus, this method alone has not proven fully satisfactory.

A different method of controlling the combustion temperatures, and thus minimizing the formation of pollutants during combustion of carbonaceous fuels, is to modify the ratios of fuel and air to create a rich (over-fueled) mixture or a lean (under-fueled) mixture. For example, a two-stage combustion process can include a first rich combustion zone and a second lean combustion zone. The so-called sub- and super-stoichiometric ratios of air to fuel generally limit the combustion temperatures, but localized regions of high temperatures may still occur where stoichiometric ratios of fuel and air combust. Additionally, as in the water- and steam-cooled systems described above, some amounts of NOx are formed even at the lower combustion temperatures.

Another method of reducing pollutants is described in U.S. Pat. No. 5,715,673 to Beichel. In one embodiment, a hydrocarbon fuel and oxygen are burned in stoichiometric quantities in the presence of water and the resulting gaseous mixture is used to drive three power turbines. Because the fuel and oxygen combustion reactants include little or no nitrogen, virtually no NOx is formed. Undesirably, however, the plant net thermal efficiency of this process is limited to about 44% to 48%. Additionally, the stoichiometric combustion lacks the flexibility of providing useful by-product fuels such as hydrogen and methanol.

Thus, there exists a need for a power generation apparatus and method for combusting carbonaceous fuel without producing NOx and SOx. The apparatus and method should be highly efficient and not overly complex, so as to minimize size, likelihood of failure, and initial and maintenance costs. Preferably, the plant net thermal efficiency should exceed 50%. Finally, the apparatus and method should be versatile so that varying amounts of electricity and other useful products can be generated according to changing needs.

BRIEF SUMMARY OF THE INVENTION

A low-emission, staged-combustion power generation system and associated method for generating power are provided. The power generation system and method of the invention provide for the generation of power, for example, in the form of electricity, without the formation of polluting nitrous oxides (NOx) and sulfur oxides (SOx) by combusting a carbonaceous fuel, such as methane, synthesis gas, or biomass fuels, with an oxidizing fluid. Both the fuel and the oxidizing fluid are substantially free of nitrogen and sulfur. The power generation system and method are efficient due, in part, to a multi-staged combustion in which the carbonaceous fuel is partially combusted before passing through a first power take-off device and subsequently reheated and passed through one or more additional power take-off devices. A sub-stoichiometric rate of oxygen ensures that the initial combustion is a partial combustion of the carbonaceous fuel. Additionally, the exhaust gases from one or more of the power take-off devices can be extracted and processed to provide quantities of useful products such as hydrogen, methanol, steam, carbon dioxide, and other hydrocarbons.

According to one aspect of the present invention, a method of generating power is provided. According to this aspect, a carbonaceous fuel, such as methane, is supplied to a gas generator. A first oxidizing fluid is supplied to the gas generator at a sub-stoichiometric rate to produce an equivalence ratio greater than 1.0, i.e., a fuel rich mixture. For example, the first oxidizing fluid may be supplied to the gas generator at a sub-stoichiometric rate of between about 0 and 50 percent to produce an equivalence ratio above 2.0. The carbonaceous fuel is combusted with the first oxidizing fluid in the gas generator, producing a combusted gas. In one embodiment, at least 98 percent of the carbonaceous fuel is at least partially combusted in the gas generator to form, for example, steam, carbon dioxide, between about 12 and 22 percent hydrogen by volume, and between about 3 and 7 percent carbon monoxide by volume. The combusted gas is discharged to a first power take-off device, and then to a reheater, where it is combusted with a second oxidizing fluid to form a reheated gas. In one embodiment, the combustion in the reheater heats the combusted gas to at least 2000° F. to form the reheated gas. The reheated gas can include steam, carbon dioxide, between about 3 and 10 percent hydrogen by volume, between about 1 and 3 percent carbon monoxide by volume, and substantially no nitrogen or sulfur. The reheated gas is then discharged to a second power take-off device. The power take-off devices may be turbines that are coupled to at least one electric generator, which is rotated to generate electricity. Water can be removed from the reheated gas by passing the gas through at least one condenser and at least one compressor. The reheated gas may also be discharged to a catalytic shift reactor to convert carbon monoxide in the gas to hydrogen and carbon dioxide, a separator to separate carbon dioxide, and a carbon monoxide catalytic converter to convert the reheated gas to methanol and hydrogen.

The carbonaceous fuel and oxidizing fluids, which may be generated by separating oxygen from air, are substantially free of nitrogen and sulfur. Hence, the process produces no appreciable amounts of NOx or SOx.

According to another aspect of the invention, a variable portion of the combusted gas from the first power take-off device is discharged to a catalytic shift reactor. The catalytic shift reactor converts carbon monoxide in the variable portion of the combusted gas to hydrogen and carbon dioxide. The variable portion of the combusted gas from the catalytic shift reactor can then be discharged to a separator to separate carbon dioxide from the combusted gas. In another embodiment, a variable portion of the reheated gas from the second power take-off device is discharged to a low pressure reheater. The reheater combusts the variable portion of the reheated gas to form a twice reheated gas and discharges the twice reheated gas to a third power take-off device.

According to yet another aspect, the invention provides a method of generating power, including generating an oxidizing fluid substantially free of nitrogen and sulfur, supplying a carbonaceous fuel substantially free of nitrogen and sulfur to a gas generator, and supplying the oxidizing fluid to the gas generator at a sub-stoichiometric rate relative to the carbonaceous fuel. The carbonaceous fuel is combusted with the oxidizing fluid in the gas generator to produce a combusted gas, and the combusted gas is discharged to a first power take-off device. A first variable portion of the combusted gas is then discharged to a high pressure catalytic shift reactor, and a second variable portion of the combusted gas is discharged to an intermediate pressure reheater. The second variable portion of the combusted gas is combusted with an oxidizing fluid in the intermediate pressure reheater to form a reheated gas, and the reheated gas is discharged to a second power take-off device. Further, a first variable portion of the reheated gas is discharged to an intermediate pressure catalytic shift reactor, and a second variable portion of the reheated gas is discharged to a low pressure reheater, where the reheated gas is combusted with the oxidizing fluid to form a twice reheated gas. The twice reheated gas is discharged to a third power take-off device and a low pressure catalytic shift reactor. Finally, carbon dioxide, hydrogen, and water are separated from the first variable portion of the combusted gas, the first variable portion of the reheated gas, and the twice reheated gas.

The present invention also provides a power generating system that includes sources of a carbonaceous fuel, such as methane, and an oxidizing fluid, both of which are substantially free of nitrogen and sulfur. A gas generator is configured to receive the carbonaceous fuel and the oxidizing fluid and combust the carbonaceous fuel with the oxidizing fluid to produce a combusted gas. In one embodiment, the gas generator is capable of at least partially combusting at least about 98 percent of the carbonaceous fuel. A regulation system is configured to regulate the flow of the oxidizing fluid into the gas generator at a sub-stoichiometric rate relative to the carbonaceous fuel. A first power take-off device, such as a turbine, is configured to receive the combusted gas from the gas generator, and a reheater is configured to receive and combust the combusted gas from the first power take-off device with the oxidizing fluid to form a reheated gas. The reheater may include a partial catalytic bed to facilitate the reaction of hydrogen in the combusted gas with oxygen and may be capable of heating the combusted gas to at least 2000° F. In one embodiment, the reheated gas comprises steam, carbon dioxide, between about 3 and 10 percent hydrogen by volume, between about 1 and 3 percent carbon monoxide by volume, and substantially no nitrogen or sulfur. A second power take-off device, such as a turbine, is configured to receive the reheated gas from the reheater. At least one generator is coupled to the first and second power take-off devices. The power generation system may also include a catalytic shift reactor configured to receive the reheated gas from the second power take-off device, at least one condenser and at least one compressor configured to receive the reheated gas from the second power take-off device, and a separator configured to receive the reheated gas from the second power take-off device and capable of separating carbon dioxide from the reheated gas. The power generating system can include an air separation plant for producing the oxidizing fluid from air, and the separator may be configured to receive cryogenic nitrogen from the air separation plant.

In another embodiment, the power generation system includes a carbon monoxide catalytic converter configured to receive the reheated gas from the second power take-off device. A catalytic shift reactor may be configured to receive a variable portion of the combusted gas from the first power take-off device and convert the combusted gas to hydrogen and carbon dioxide. A separator may also be configured to receive the variable portion of the combusted gas from the catalytic shift reactor and separate carbon dioxide from the combusted gas. Additionally, the power generation system may include a low pressure reheater configured to receive and combust a variable portion of the reheated gas from the second power take-off device to form a twice reheated gas and discharge the twice reheated gas to a third power take-off device.

The present invention also provides a power generating system including sources of a carbonaceous fuel and an oxidizing fluid, both substantially free of nitrogen and sulfur. A gas generator is configured to receive the carbonaceous fuel and the oxidizing fluid and combust them to produce a combusted gas. A regulation system is configured to regulate the flow of the oxidizing fluid into the gas generator at a sub-stoichiometric rate relative to the carbonaceous fuel. A first power take-off device is configured to receive the combusted gas from the gas generator. A high pressure catalytic shift reactor is configured to receive a first variable portion of the combusted gas from the first power take-off device, and an intermediate pressure reheater is configured to receive and combust a second variable portion of the combusted gas from the first power take-off device with the oxidizing fluid to form a reheated gas. A second power take-off device is configured to receive the reheated gas from the intermediate pressure reheater. An intermediate pressure catalytic shift reactor is configured to receive a first variable portion of the reheated gas from the second power take-off device, and a low pressure reheater is configured to receive and combust a second variable portion of the reheated gas from the second power take-off device with the oxidizing fluid to form a twice reheated gas. A third power take-off device is configured to receive the twice reheated gas from the low pressure reheater. A low pressure catalytic shift reactor is configured to receive the twice reheated gas from the third power take-off device. At least one separator is configured to receive the first variable portion of the combusted gas, the first variable portion of the reheated gas, and the twice reheated gas and to separate carbon dioxide, hydrogen, and water from the gases. At least one generator is coupled to the first, second, and third power take-off devices.

Thus, the present invention provides a power generation apparatus and method that satisfy the needs of the prior art. The staged combustion does not produce polluting NOx and SOx, and the power generation system and method are highly efficient. Additionally, the initial combustion is a partial combustion, allowing the generation and extraction of useful by-products.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
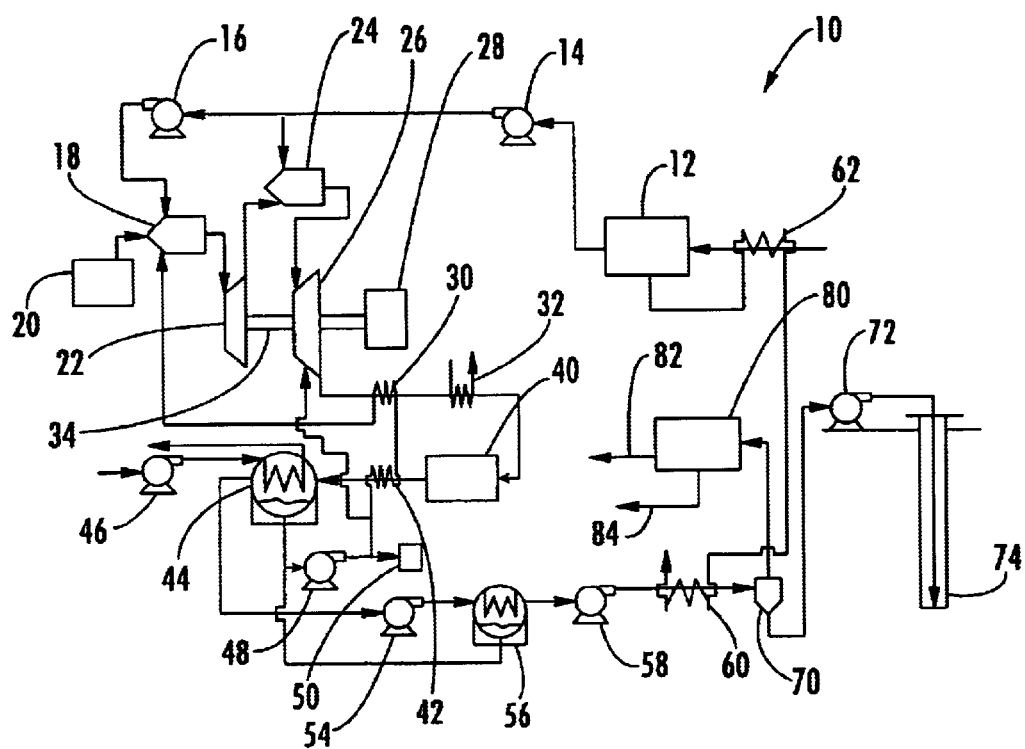
FIG. 1 illustrates a schematic of the low-emission power generation system with two turbines and a reheater according to one embodiment of the present invention.

There is shown in FIG. 1 a diagram illustrating the major components of a low-emission power generation system 10 according to one advantageous embodiment of the present invention. The power generation system 10 includes a gas generator 18, turbines 22, 26, a reheater 24, and an electric generator 28. These and other components of the power generation system 10 are fluidly connected by pipes, which are represented generally in FIGS. 1 and 3 by solid lines connecting the various system components.

The power generation system 10 combusts a carbonaceous fuel with an oxidizing fluid to generate kinetic and/or electrical energy along with combustion by-products including water and carbon dioxide. The carbonaceous fuel may be a hydrocarbon, such as methane, ethane, or propane, or a mixture of hydrocarbons and may be derived from crude oil or a biomass fuel. Two preferable carbonaceous fuels are methane and synthesis gas, or syngas, which includes hydrogen and carbon monoxide. The carbonaceous fuel can be in solid, liquid, gaseous, or combined phases. A source 20 for the carbonaceous fuel provides the fuel to the gas generator 18. The source 20 may be a storage vessel or a supply pipe from a fuel generator. The carbonaceous fuel is substantially free of nitrogen and sulfur. In the context of this patent, the phrase "substantially free of nitrogen and sulfur" indicates a combined content of less than [0.1] percent nitrogen and sulfur by weight and preferably less than [0.01] percent.

Oxygen is provided for combustion in the form of an oxidizing fluid, for example gaseous oxygen ($O_2$) or liquid oxygen (lox). In the embodiment of FIG. 1, the oxygen is derived from atmospheric air using an air separation plant 12. Atmospheric air, primarily including nitrogen, oxygen, and carbon dioxide, enters the air separation plant 12 through a heat exchanger 62, which cools the air. The air separation plant 12 removes at least most of the nitrogen from the air and discharges the oxygen substantially free of nitrogen and sulfur. The nitrogen can be removed using a cryogenic process, as will be understood by one of ordinary skill in the art. In that case, the cryogenic nitrogen that is derived from the process can be sold or used in subsequent cooling processes in the power generation system 10. In other embodiments, the oxidizing fluid can be derived from sources other than the air separation plant 12, for example, from a storage tank, delivery pipeline, or other oxygen generation apparatuses which are known in the art.

The oxidizing fluid is pumped by pumps 14, 16 to the gas generator 18, and the oxidizing fluid and carbonaceous fuel enter the gas generator 18 at a high pressurize, for example, between about 1500 and 1700 psi. Water or steam from a downstream heat exchanger 30 is also supplied to the gas generator 18. Unless expressly noted otherwise, the term "water" as used throughout this patent is meant to include water in any form, for example, liquid water or steam. Also, although the term "steam" is used to indicate water that is generally in a gaseous form, steam may include a liquid component. The water supplied to the gas generator 18 is generally cooler than the overall temperature of the combustion products within the gas generator 18. The water, which cools the combustion, can be supplied to the gas generator 18 at varying amounts as necessary to regulate the combustion temperature. A target temperature for combustion can be determined by considering the effect of the combustion temperature on the efficiency of combustion, the thermal stress on system components, and safety. For example, in the embodiment shown in FIG. 1, the combustion temperature could exceed 5000° F. if the water were not used for cooling. With the water, however, the combustion temperature is maintained at between about 1500° F. and 4000° F., thus decreasing the thermal stress on system components such as the combustion chamber, injectors, turbines, and the like.

The gas generator 18 includes a regulation system 12a that regulates the flow of the carbonaceous fuel and oxidizing fluid into a combustion chamber (not shown) of the generator 18. The regulation system can comprise any such device known to those skilled in the art, for example, an adjustable valve or a more sophisticated metering device. The regulation system receives the pressurized oxidizing fluid from the pump 16 and regulates the oxidizing fluid into the gas generator 18 at a sub-stoichiometric rate relative to the carbonaceous fuel. By "sub-stoichiometric rate" it is meant that the amount of oxygen provided in the oxidizing fluid for combustion is less than the amount of oxygen that is required to combust all of the carbonaceous fuel to its final products. For example, the chemical equation:

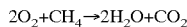

$$2O_2 + CH_4 \rightarrow 2H_2O + CO_2$$

indicates a reaction between oxygen ($O_2$) and methane ($CH_4$) with products of water ($H_2O$) and carbon dioxide ($CO_2$). The reaction of each methane molecule requires two oxygen molecules. Thus, a sub-stoichiometric rate of oxidizing fluid means that less than two oxygen molecules are provided for each methane molecule in the gas generator 18. The sub-stoichiometric rate can be quantified as a percent of the amount of oxidizing fluid that is supplied for combustion relative to the amount of oxidizing fluid that is required for complete combustion of the fuel. For example, a 75% stoichiometric rate of oxidizing fluid relative to the methane indicates a supply of 75% of the amount of oxidizing fluid that is required for complete combustion of the methane, or three oxygen molecules for every two methane molecules. The sub-stoichiometric rate can also be described by an equivalence ratio. The equivalence ratio is defined as a fuel/oxidizing fluid ratio divided by a stoichiometric fuel/oxidizing fluid ratio, where the fuel/oxidizing fluid ratio is the ratio of fuel to oxidizing fluid that is supplied for combustion, and the stoichiometric fuel/oxidizing fluid ratio is the ratio of fuel to oxidizing fluid that produces complete combustion. Thus, the 75% stoichiometric rate would result in an equivalence ratio equal of about 1.33.

In general, a sub-stoichiometric rate of oxidizing fluid prevents the complete combustion of all of the carbonaceous fuel. For the specific chemical reaction of oxygen and methane represented by the equation above, a sub-stoichiometric rate of oxidizing fluid prevents the complete combustion of all of the methane to water and carbon dioxide. Instead, although all of the methane may be combusted to other compounds, the methane is not combusted completely and exclusively to water and carbon dioxide. The term "partial combustion" refers to combustion of a fuel to "intermediate" products. For example, the methane is combusted in the high pressure gas generator 18, but at least some of the methane is only partially combusted to the intermediate products of hydrogen ($H_2$), carbon monoxide (CO), and other hydrocarbons instead of the final combustion products of water and carbon dioxide. In the embodiment shown in FIG. 1, all or nearly all of the methane that is supplied to the high pressure gas generator 18 is at least partially combusted in the high pressure gas generator 18. Specifically, at least 95 percent of the methane is combusted to the intermediate or final combustion products in the gas generator, preferably at least 98 percent, and most preferably at least 100 percent. Therefore, the subsequent combustion that results in the reheater 24, described more fully below, is not the combustion of methane. Rather, the reheater 24 combusts one or more of the intermediate products of the first combustion, such as hydrogen with oxygen.

The gas generator 18 is fluidly connected to a first power take-off device, which is the high pressure turbine 22 in the illustrated embodiment. The combusted gas, comprising the products of combustion from the gas generator 18, is discharged from the gas generator 18 to the high pressure turbine 22, which expands the combusted gas. The high pressure turbine 22 generates kinetic energy from expansion of the combusted gas, and the temperature and pressure of the combusted gas are reduced in the high pressure turbine 22. The high pressure turbine 22 is mechanically coupled to an electric generator 28, which generates electricity that is output from the power generation system 10.

The high pressure turbine 22 is fluidly connected to the reheater 24, and the reheater 24 is also fluidly connected to the air separation plant 12. Oxidizing fluid from the air separation plant 12 is mixed in the reheater 24 with the combusted gas from the first turbine 22. The combusted gas is combusted with the oxidizing fluid, increasing the temperature and pressure of the combusted gas and forming a reheated gas. Although additional fuel and/or other combustible materials can be delivered to reheater 24, it is preferred that the reheater 24 receives the combusted gas from the high pressure turbine 22 and no additional carbonaceous fuel. In one advantageous embodiment of the invention, oxidizing fluid is supplied to the reheater 24 at a sub-stoichiometric rate relative to the combustible materials in the combusted gas. However, the sub-stoichiometric rate of the oxygen in the oxidizing fluid supplied to the reheater 24 relative to the amount of oxygen required for complete combustion of the combustible materials in the combusted gas is higher than the sub-stoichiometric rate of oxygen supplied to the gas generator 18. According to one embodiment, oxygen is supplied to the gas generator 18 at a sub-stoichiometric rate of less than about [50] percent and to the reheater at a sub-stoichiometric rate of between about [50 and 90] percent. Thus, the reheater 24 results in a more complete combustion of the fuel that is initially combusted in the gas generator 18, and increases the efficiency of the system. In other embodiments, the oxidizing fluid may be supplied to the reheater 24 at a sub-stoichiometric rate that is lower than the sub-stoichiometric rate in the gas generator 18, a stoichiometric rate, or even a super-stoichiometric rate. Even at non-stoichiometric rates, high combustion temperatures can occur in the reheater 24, and in one embodiment, the temperature of the reheated gas exceeds 2000° F.

The reheater 24 is also fluidly connected to the second power take-off device, which is the intermediate pressure turbine 26 in the illustrated embodiment. The intermediate pressure turbine 26 receives the reheated gas from the reheater 24 and water from one or more downstream condensers 44, 56. Similar to the combusted gas in the high pressure turbine 22, the reheated gas in the intermediate pressure turbine 26 expands and cools and is used to generate kinetic energy. Significantly, like the gas generator 18, the oxidizing fluid received by the reheater 24 is substantially free of nitrogen and sulfur. Therefore, little or no NOx or SOx is formed in the combustion that occurs in the reheater 24.

In the illustrated embodiment of FIG. 1, the intermediate pressure turbine 26 is mechanically coupled to the electric generator 28. Although the turbines 22, 26 are shown as mechanically coupled by a single shaft 34 to a single generator 28, it is appreciated that any number of shafts and generators may be employed. For example, each turbine 22, 26 may be mechanically coupled to a single generator by different shafts or each turbine 22, 26 may be coupled to different generators. Further, the power take-off devices may include components other than turbines that are coupled to a generator. For example, the power take-off devices may include one or more turbine-actuated shafts for powering an industrial process or a propulsion device such as a propeller for a watercraft propulsion system.

The intermediate pressure turbine 26 is fluidly connected to a catalytic shift reactor 40 via heat exchangers 30, 32. Heat exchanger 30 is also fluidly connected to downstream condensers 44, 56 and the gas generator 18. The heat exchanger 30 cools the reheated gas received from the intermediate pressure turbine 26 and heats the water from the condensers 44, 56 before the water enters the gas generator 18. Heat exchanger 32 can be fluidly connected to any of a number of downstream condensers 44, 56, as will be understood by one skilled in the art, and cools the reheated gas emerging from the intermediate pressure turbine 26 while heating water from the condensers 44, 56 for use in the gas generator 18 or elsewhere in the system 10. The catalytic shift reactor 40 reacts the carbon monoxide in the reheated gas with water to form hydrogen and carbon dioxide. The water for the combustion in the catalytic shift reactor 40 can include the steam already present in the reheated gas or additional water may be added.

The catalytic shift reactor 40 is also fluidly connected to a heat exchanger 42. The heat exchanger 42 is fluidly connected to the downstream condensers 44, 56 and provides preheating for the water that is received by heat exchanger 30. Condenser 44 is fluidly connected to receive and cool the reheated gas from the catalytic shift reactor 40. The reheated gas subsequently flows to a pump 54, a condenser 56, and a pump 58. A pump 48 is fluidly connected to provide water from the condensers 44, 56 to the heat exchanger 42 and the intermediate pressure turbine 26. A discharge 50 allows removal of water that flows from the condensers 44, 56. The pump 58 pumps the reheated gas from condenser 56 through the heat exchanger 60 and to a separator 70. Heat exchanger 60 is fluidly connected to the air separation plant 12 so that nitrogen from the air separation plant 12 can be used to cool the reheated gas in the heat exchanger 60.

The separator 70 removes liquid carbon dioxide from the reheated gas by cyclonic action, or by other known methods. For example, in the embodiment of FIG. 1, the separator 70 receives the reheated gas from the heat exchanger 60 at a temperature of about −40° F. and a pressure of about 145 psi. At this temperature and pressure, the carbon dioxide is in the liquid phase and can be separated from the reheated gas. Cooling of the reheated gas in the heat exchanger 60 can be achieved using the cryogenic nitrogen from the air separation plant 12 or by using other methods known in the art. Also, the carbon dioxide can be separated from the reheated gas by known methods other than cooling. The reheated gas from which the carbon dioxide has been extracted is referred to as a hydrogen product gas.

The separator 70 is fluidly connected to a carbon monoxide catalytic converter 80, which receives the hydrogen product gas from the separator 70. The carbon monoxide catalytic converter 80 catalyzes the reaction of carbon monoxide in the hydrogen product gas with hydrogen to form methanol. Hydrogen and methanol are released from the carbon monoxide catalytic converter 80 through a hydrogen product outlet 82 and methanol product outlet 84, respectively. The hydrogen and methanol can be sold, stored, or used at other stages in the generation system 10. For example, the hydrogen can be used for combustion in the power generation system 10. Alternatively, the hydrogen can be used for "hydrogen cracking," or injection into crude oil to produce lighter petroleum products that can be more readily refined into gasoline. The heating value of the hydrogen and methanol increases the net thermal efficiency of the power generation system 10, potentially to about 55%.

Similarly, the carbon dioxide that is separated from the reheated gas by the separator 70 can be sold, stored, or used. For example, as shown in FIG. 1, the carbon dioxide can be sequestered in a carbon dioxide disposal 74. One such carbon dioxide disposal 74 is an oil well. The sequestration of carbon dioxide into an oil well facilitates the extraction of oil from the well. Carbon dioxide can also be sequestered in coal beds. Alternatively, the carbon dioxide can be stored, for example, in abandoned mines or in underwater storage facilities where water pressure would maintain the carbon dioxide in a liquid state. The 55% plant net thermal efficiency for the illustrated power generation system 10 includes the energy required to liquefy and pump the carbon dioxide.

Figure 2:
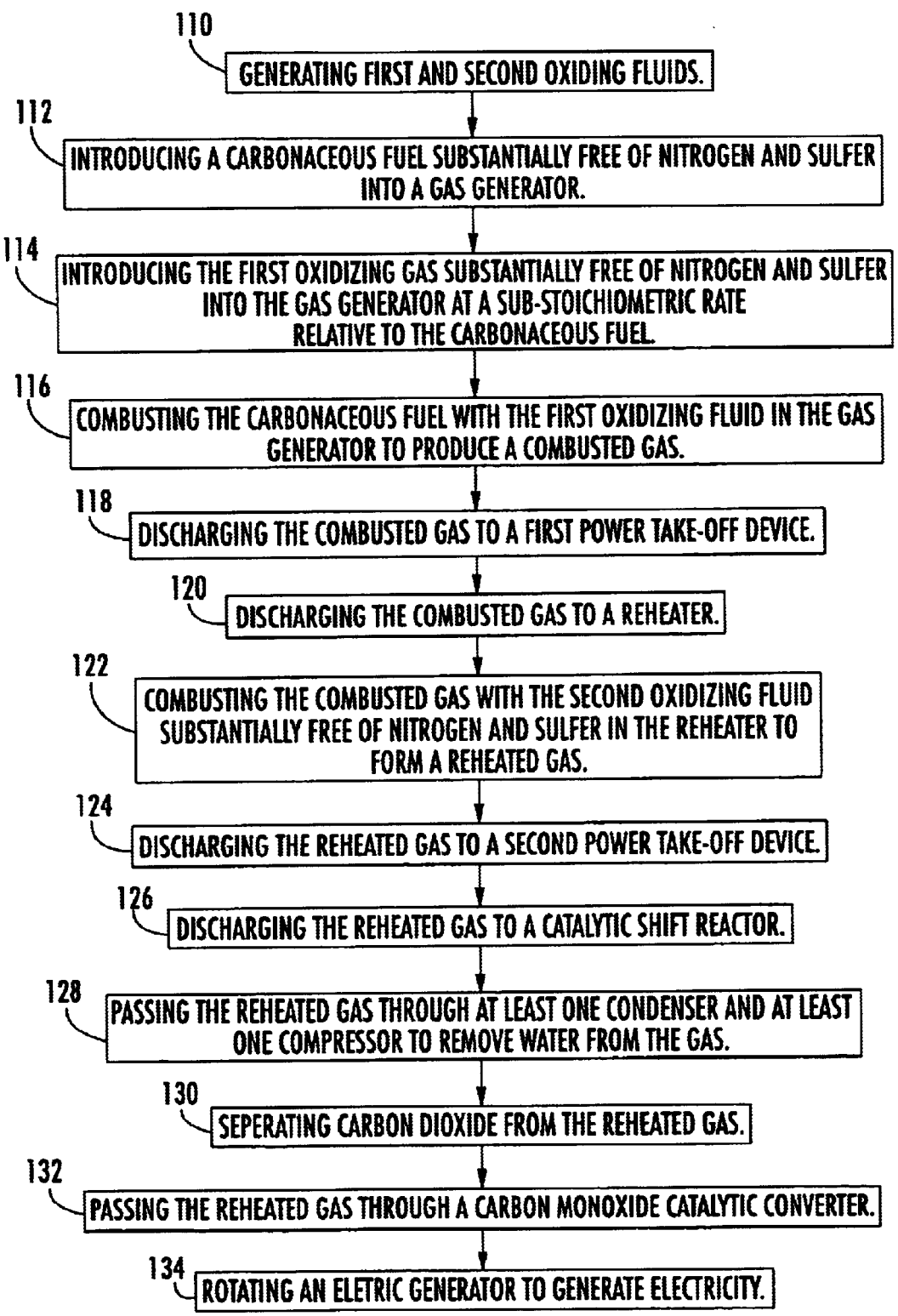
FIG. 2 illustrates a flow diagram of a low-emission method of generating power that can be practiced with the power generation system of FIG. 1.

A low-emission method of generating power is illustrated in FIG. 2. The method can be practiced using the power generation system 10 shown in FIG. 1. In Block 110, first and second oxidizing fluids are generated, for example, by separating oxygen from air in the air separation plant. A carbonaceous fuel, which is substantially free of sulfur and nitrogen is supplied to a gas generator. Block 112. In a preferred embodiment, the carbonaceous fuel includes methane. The first oxidizing fluid, which is also substantially free of sulfur and nitrogen, is supplied to the gas generator at a sub-stoichiometric rate relative to the carbonaceous fuel. Block 114. The carbonaceous fuel is then combusted with the first oxidizing fluid in the gas generator to produce a combusted gas, and the combusted gas is discharged to a first power take-off device. Blocks 116, 118. Next, the combusted gas is discharged to a reheater. Block 120. In the reheater, the combusted gas is combusted with a second oxidizing fluid, which is substantially free of nitrogen and sulfur, to form a reheated gas. Block 122. The second oxidizing fluid can be identical to the first oxidizing fluid, and may also be derived from air in the air separation plant. Next, the reheated gas is discharged to a second power take-off device. Block 124. The reheated gas is then discharged to a catalytic shift reactor. Block 126. The reheated gas is passed through at least one condenser and at least one compressor to remove water from the gas. Block 128. The water may be stored and/or supplied to other components of the generating plant. Next, the carbon dioxide from the reheated gas is separated, and may be used for processes that are not directly related to the generation of power, for example, to urge fluids from a well or reservoir. Block 130. The reheated gas is passed through a carbon monoxide converter. Block 132. An electric generator is rotated to generate electricity. Block 134.

Figure 3:
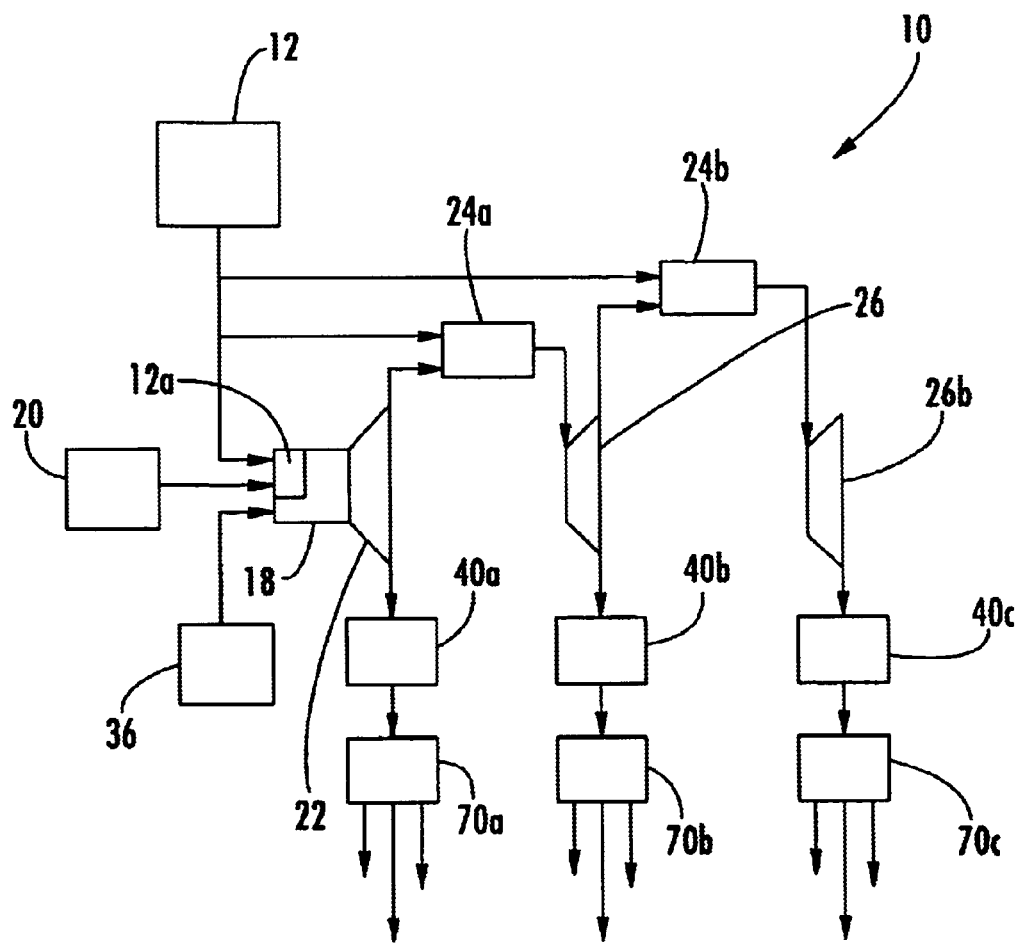
FIG. 3 illustrates a schematic of a low-emission power generation system with three turbines and two reheaters according to another embodiment of the present invention.

The power generation system 10 according to the present invention can include any number of power take-off devices and reheaters. Additionally, portions of the exhaust gases from any or all of the power take-off devices can be extracted for their hydrogen, methanol, or other intermediate combustion products. The remaining portions of the exhaust gases from the power take-off devices are reheated by combustion with oxidizing fluid. For example, there is shown in FIG. 3 a power generation system 10, which includes three turbines 22, 26, 26b and two reheaters 24a, 24b. A high pressure gas generator 18 receives oxidizing fluid from an oxidizing fluid source 12, methane from a methane source 20, and water from a water source 36. The high pressure gas generator 18 is configured to combust the methane with the oxidizing fluid under sub-stoichiometric conditions, i.e., fuel rich combustion. The combusted gas from the combustion drives the high pressure turbine 22. The high pressure turbine 22 is fluidly connected to the intermediate pressure reheater 24a and a high pressure catalytic shift reactor 40a. The intermediate pressure reheater 24a is configured to receive the combusted gas from the high pressure turbine 22 and oxidizing fluid from the oxidizing fluid source. The intermediate pressure reheater 24a heats the combusted gas to form a reheated gas. The intermediate pressure reheater 24a is fluidly connected to the intermediate pressure turbine 26, which is configured to receive the reheated gas from the intermediate pressure reheater 24a. The intermediate pressure turbine 26 is fluidly connected to the low pressure reheater 24b and an intermediate pressure catalytic shift reactor 40b. The low pressure reheater 24b is configured to receive the reheated gas from the intermediate pressure turbine 26 and oxidizing fluid from the oxidizing fluid source. The low pressure reheater 24b heats the reheated gas to form a twice reheated gas. The low pressure reheater 24b is also fluidly connected to the low pressure turbine 26b, which is configured to receive the twice reheated gas from the low pressure reheater 24b. The low pressure turbine 26b, in turn, is fluidly connected to a low pressure catalytic shift reactor 40c. Similar to the reheater 24 that is described in connection with FIG. 1 above, the intermediate pressure reheater 24a and the low pressure reheater 24b do not receive methane from the methane source. Further, all or nearly all of the methane that is supplied to the high pressure gas generator 18 is at least partially combusted in the high pressure gas generator 18. Thus, the combustion that occurs in the intermediate pressure reheater 24a and the low pressure reheater 24b is not the combustion of methane, but rather a combustion of one or more of the intermediate products of the first combustion, for example, hydrogen with oxygen.

One or more regulation systems 12a regulate the flow of the oxidizing fluid into the combustion chambers (not shown) of the generator 18, the intermediate pressure reheater 24a, and the low pressure reheater 24b. In one advantageous embodiment of the invention, the oxidizing fluid is supplied at sub-stoichiometric rates to the intermediate pressure reheater 24a and the low pressure reheater 24b. Further, the sub-stoichiometric rate is lowest in the gas generator 18, higher in the intermediate pressure reheater 24a, and highest in the low pressure reheater 24b. For example, in one embodiment of the present invention, oxygen is supplied to the gas generator 18 at a rate of between about 0 and 50 percent, the intermediate pressure reheater 24a at between about 50 and 90 percent, and the low pressure reheater 24b at above about 90 percent. Thus, combustion becomes more complete as the combustible fluids progress through the power generation system 10. In other embodiments, however, the oxidizing fluid can be supplied to the intermediate pressure reheater 24a and the low pressure reheater 24b at other sub-stoichiometric rates, stoichiometric rates, or even super-stoichiometric rates.

The catalytic shift reactors 40a, 40b, 40c are configured to receive the combusted gas, reheated gas, and twice reheated gas from the turbines 22, 26, 26b. The catalytic shift reactors 40a, 40b, 40c convert the carbon monoxide in the gases to hydrogen and carbon dioxide. Subsequently, the gas flows from the high pressure catalytic shift reactor 40a, intermediate pressure catalytic shift reactor 40b, and low pressure catalytic shift reactor 40c to the high pressure separator 70a, intermediate pressure separator 70b, and low pressure separator 70c, respectively. The separators 70a, 70b, 70c separate the hydrogen, water, and carbon dioxide from the gases.

The outflow of the combusted gas, reheated gas, and twice reheated gas from the turbines 22, 26, 26b can be adjusted to control the amounts of combusted gas, reheated gas, and twice reheated gas that are directed to the reheaters 24a, 24b and the catalytic shift reactors 40a, 40b, 40c. Thus, efficiency tuning can be performed during operation so that the combustion is optimized in the reheaters 24a, 24b. Moreover, the amount of water, hydrogen, and carbon dioxide produced by the catalytic shift reactors 40a, 40b, 40c and separators 70a, 70b, 70c can be controlled along with the amount of electricity produced by the power generation system 10. The removal of hydrogen through the catalytic shift reactors 40a, 40b, 40c and separators 70a, 70b reduces the available hydrogen for combustion in the intermediate pressure turbine 26 and low pressure turbine 26b, thus reducing the electricity generation. Changes in electricity generation may be desirable based on such factors as demand, price, or cost of production. The hydrogen output from the separators 70a, 70b, 70c can also be used for other processes, stored for future use, or sold. Thus, the desired production of electricity may depend on the demand factors for hydrogen as well as electricity. Further, because the extraction of hydrogen from the separators 70a, 70b, 70c can affect the efficiency of the electricity generation process, the desired efficiency may be a factor as well.

Figure 4:
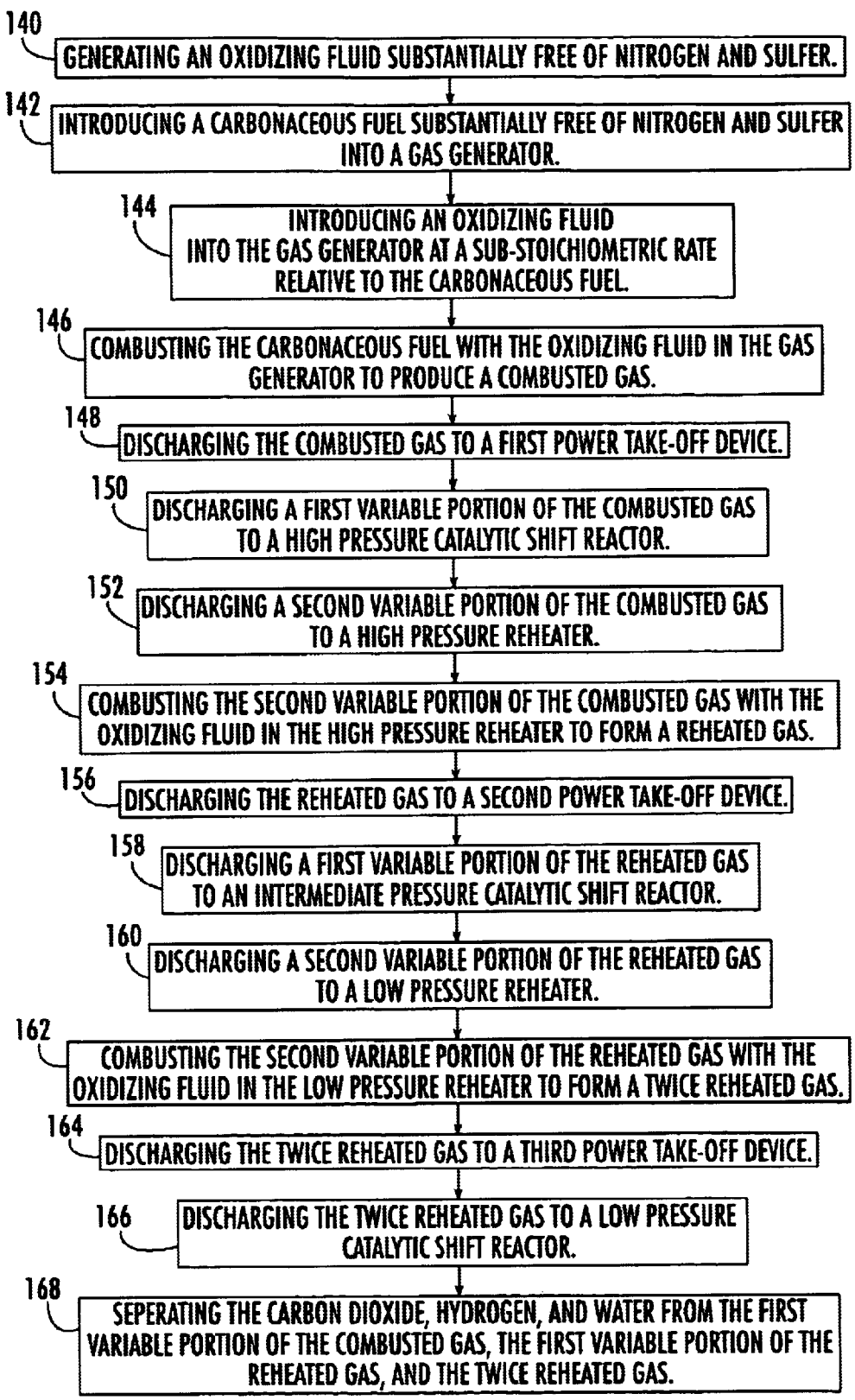
FIG. 4 illustrates a flow diagram of a low-emission method of generating power that can be practiced with the power generation system of FIG. 3.

FIG. 4 illustrates a low-emission method of generating power, which can be practiced using the power generation system 10 shown in FIG. 3. Block 140 includes generating an oxidizing fluid substantially free of nitrogen and sulfur. As noted in connection with the method illustrated in FIG. 2, the oxidizing fluid can be generated using an air separation plant. Also, similar to the previous method, a carbonaceous fuel substantially free of nitrogen and sulfur is supplied to a gas generator. Block 142. The oxidizing fluid is supplied to the gas generator at a sub-stoichiometric rate relative to the carbonaceous fuel, for example, by using a regulation system. Block 144. The carbonaceous fuel is combusted with the oxidizing fluid in the gas generator to produce a combusted gas, and the combusted gas is discharged to a first power take-off device. Blocks 146, 148. A first variable portion of the combusted gas is then discharged to a high pressure catalytic shift reactor for further processing. Block 150. A second variable portion of the combusted gas is discharged to an intermediate pressure reheater. Block 152. The oxidizing fluid can be supplied to the intermediate pressure reheater 24 at a sub-stoichiometric rate, a stoichiometric rate, or a super-stoichiometric rate. The first and second variable portions of the combusted gas can be determined and varied automatically or manually, and the portions can be varied for a number of purposes. For example, the portions can be varied to increase efficiency of the power generation system, adjust the production of mechanical or electrical power, or to adjust the production of hydrogen, carbon dioxide, methanol, or other products. The second variable portion of the combusted gas is combusted with the oxidizing fluid in the intermediate pressure reheater to form a reheated gas. Block 154. The reheated gas is discharged to a second power take-off device. Block 156. A first variable portion of the reheated gas is discharged to an intermediate pressure catalytic shift reactor for further processing. Block 158. A second variable portion of the reheated gas is discharged to a low pressure reheater. Block 160. The first and second variable portions of the reheated gas can also be varied as described above in connection with the combusted gas. Next, the second variable portion of the reheated gas is combusted with the oxidizing fluid in the low pressure reheater to form a twice reheated gas, and the twice reheated gas is discharged to a third power take-off device. Blocks 162, 164. The oxidizing fluid can be supplied to the low pressure reheater at a sub-stoichiometric rate, a stoichiometric rate, or a super-stoichiometric rate. The twice reheated gas is discharged to a low pressure catalytic shift reactor. Block 166. Carbon dioxide, hydrogen, and water are separated from the first variable portion of the combusted gas, the first variable portion of the reheated gas, and the twice reheated gas. Block 168. The carbon dioxide, hydrogen, and water can be used, sold, or processed further. Carbon monoxide contained in any of the exhaust gases can be converted to methane, for example, by using a carbon monoxide catalytic reactor.

Figure 5:
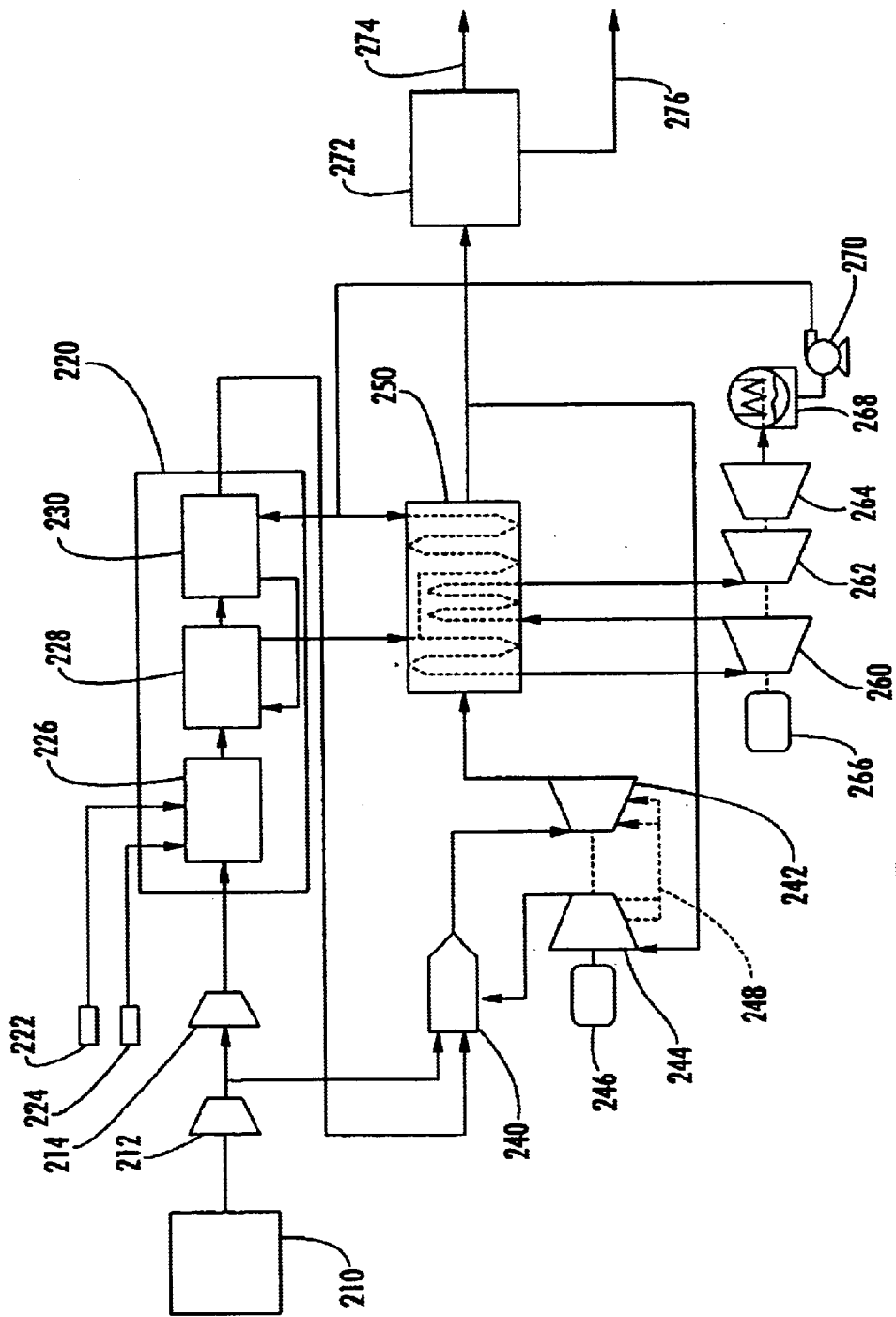
FIG. 5 illustrates a schematic of low-emission power generation system with a reheater as the initial combustion device according to another embodiment of the present invention.

FIG. 5 illustrates a low-emission power generation system according to another embodiment of the present invention. The power generation system of FIG. 5 does not include a gas generator. Instead, a reheater 240 receives oxygen and a carbonaceous gas, for example, a synthesis gas, and provides the initial combustion. The oxygen is generated in an air separation plant 210, which removes at least most of the nitrogen from the air and discharges the oxygen substantially free of nitrogen and sulfur. As described above, the nitrogen can be removed using a cryogenic process or can be derived from sources other than the air separation plant 210.

In the illustrated embodiment of FIG. 5, the synthesis gas, or syngas, is generated in a syngas generator 220. The syngas generator 220 is shown for illustrative purposes only, and it is understood that syngas can be obtained by other processes known in the art. Further, combustion gases other than syngas can be used. For example, the combustion gas can comprise methane, ethane, propane, or a mixture of hydrocarbons and may be derived from crude oil or a biomass fuel.

The oxidizing fluid is compressed by compressors 212, 214 and delivered to the reheater 240 and the syngas generator 220. The syngas generator 220 includes a gasifier 226 that also receives water and petroleum coke, or petcoke, from water and petcoke sources 222, 224. The petcoke is gasified in the gasifier 226 to form an exhaust gas that includes the syngas, as known in the art. The syngas comprises hydrogen, carbon monoxide, and carbon dioxide, and in this embodiment specifically comprises about 50 percent carbon monoxide, 34.2 percent hydrogen, and 15.8 percent carbon dioxide. The syngas is passed through a high temperature heat recoverer 228 and a low temperature heat recoverer 230, both of which are thermally coupled to a heat recovery steam generator 250, described below.

The syngas is then discharged to the reheater 240. The syngas enters the reheater 240, as do the oxygen and a diluent. The diluent is a recycle gas that includes steam and carbon dioxide. The diluent dilutes the oxygen in the reheater, limiting the temperature in the reheater 240. The product gas is combusted in the combustion chamber (not shown) of the reheater 240 to form a combusted gas or combustion product, which is discharged to a primary turbine 242. The combustion product is expanded in the primary turbine 242 and energy is generated by rotating an electric generator 246 that is mechanically or hydraulically coupled to the primary turbine 242. The combustion product from the primary turbine 242 is discharged to the heat recovery steam generator 250 where the combustion product is cooled. The heat recovery steam generator 250 acts as a heat exchanger by using thermal energy of the combustion product discharged from the primary turbine 242 to heat an intermediate exhaust gas from the high temperature heat recoverer 228. The intermediate exhaust gas is then discharged to a first turbine 260. The intermediate exhaust gas is discharged from the first turbine 260 to the heat recovery steam generator 250 where it is reheated and discharged to a second turbine 262 and then a third turbine 264. The intermediate exhaust gas is expanded in the turbines 260, 262, 264, and the temperature and pressure of the intermediate exhaust gas are decreased. The operating pressures of the turbines 260, 262, 264 decrease consecutively so that the second turbine 262 operates at a pressure that is lower than that of the first turbine 260 and higher than that of the third turbine 264. The turbines 260, 262, 264 are coupled to an electric generator 266, which is rotated by the turbines 260, 262, 264 and generates electricity. Subsequently, the intermediate exhaust gas is discharged to a condenser 268 and a pump 270, which returns the condensed exhaust to the syngas generator 220.

The combustion product is cooled in the heat recovery steam generator 250. A first portion of the combustion product is recycled from the heat recovery steam generator 250 to a compressor 244, which compresses the combustion product and discharges the combustion product as the diluent to the reheater 240. Bleed lines 248 connect the compressor 244 to the primary turbine 242. The compressor 244 can be driven by a shaft that also couples the primary turbine 242 to the electric generator 246. Although not shown, a single drive shaft may be driven by all of the turbines 242, 260, 262, 264, and the same shaft may also drive the compressor 244. In the embodiment of FIG. 5, the diluent comprises approximately 67 percent steam and 33 percent carbon dioxide, though the actual proportions can vary.

A second portion of the combustion product is discharged to a high pressure compressor 272 where it is compressed to liquefy the carbon dioxide in the combustion product. The carbon dioxide is then discharged via a carbon dioxide outlet 274 and water is discharged through a water outlet 276. The carbon dioxide and water may be recycled for use in other parts of the generation cycle or discharged.

Many modifications and other embodiments of the invention will come to mind to one skilled in the art to which this invention pertains having the benefit of the teachings presented in the foregoing descriptions and the associated drawings. For example, the number and configuration of many of the components of the present invention can be modified without exceeding the scope of the invention. Specifically, it will be understood that piping, pumps, condensers, and other components can be added, removed, or reconfigured from their number and orientation of the exemplary embodiments. Additionally, although some components are said to "discharge" or "receive" a fluid to or from another component, such language is not meant to imply that the components are necessarily directly connected. Rather, one or more other components may be interposed between the discharging and receiving components. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of generating power, comprising:

supplying a carbonaceous fuel substantially free of nitrogen and sulfur to a gas generator;

supplying a first oxidizing fluid substantially free of nitrogen and sulfur to the gas generator at a substoichiometric rate relative to the carbonaceous fuel;

combusting the carbonaceous fuel with the first oxidizing fluid in the gas generator to produce a combusted gas;

discharging the combusted gas to a first power take-off device;

discharging at least a portion of the combusted gas from the first power take-off device to a reheater;

combusting the combusted gas with a second oxidizing fluid substantially free of nitrogen and sulfur in the reheater to form a reheated gas; and discharging the reheated gas to a second power take-off device.

2. A method of generating power according to claim 1, further comprising providing at least one of the first and second oxidizing fluids by separating oxygen from air.

3. A method of generating power according to claim 1, wherein the step of supplying the carbonaceous fuel to the gas generator comprises supplying methane.

4. A method of generating power according to claim 1, wherein said step of supplying the first oxidizing fluid to the gas generator at a sub-stoichiometric rate comprises supplying the first oxidizing fluid to the gas generator at a sub-stoichiometric rate of between 0 and 50 percent relative to the carbonaceous fuel.

5. A method of generating power according to claim 1, further comprising regulating a supply of the second oxidizing fluid to the reheater to be sub-stoichiometric relative to combustible materials in the combusted gas.

6. A method of generating power according to claim 1, wherein said step of combusting the carbonaceous fuel with the first oxidizing fluid in the gas generator comprises at least partially combusting at least 98 percent of the carbonaceous fuel.

7. A method of generating power according to claim 1, wherein said steps of discharging the combusted gas to a first power take-off device comprises discharging the combusted gas to a first turbine coupled to at least one electric generator, and discharging the reheated gas to a second power take-off device comprises discharging the reheated gas to a second turbine coupled to the at least one electric generator, and further comprising rotating the at least one electric generator to generate electricity.

8. A method of generating power according to claim 1, wherein said step of combusting the combusted gas with a second oxidizing fluid in the reheater comprises heating the combusted gas to at least 2000° F.

9. A method of generating power according to claim 1, wherein said step of combusting the combusted gas with a second oxidizing fluid in the reheater comprises producing a reheated gas comprising steam, carbon dioxide, between about 3 and 10 percent hydrogen by volume, between about 1 and 3 percent carbon monoxide by volume, and substantially free of nitrogen and sulfur.

10. A method of generating power according to claim 1, further comprising:
    subsequent to said step of discharging the reheated gas to the second power take-off device, discharging the reheated gas to a catalytic shift reactor to convert the carbon monoxide to hydrogen and carbon dioxide.

11. A method of generating power according to claim 1, further comprising:
    subsequent to said step of discharging the reheated gas to the second power take-off device, passing the reheated gas through at least one condenser and at least one compressor to remove water from the gas.

12. A method of generating power according to claim 1, further comprising:
    subsequent to said step of discharging the reheated gas to the second power take-off device, discharging the reheated gas to a separator to separate carbon dioxide from the reheated gas.

13. A method of generating power according to claim 1, further comprising:
    subsequent to said step of discharging the reheated gas to the second power take-off device, passing the reheated gas through a carbon monoxide catalytic converter to convert the reheated gas to methanol and hydrogen.

14. A method of generating power according to claim 1, further comprising discharging a variable portion of the combusted gas from the first power take-off device to a catalytic shift reactor to convert carbon monoxide in the variable portion of the combusted gas to hydrogen and carbon dioxide.

15. A method of generating power according to claim 14, further comprising discharging the variable portion of the combusted gas from the catalytic shift reactor to a separator to separate carbon dioxide from the combusted gas.

16. A method of generating power according to claim 1, further comprising discharging a variable portion of the reheated gas from the second power take-off device to a low pressure reheater, combusting the variable portion of the reheated gas to form a twice reheated gas, and discharging the twice reheated gas to a third power take-off device.

17. A method of generating power, comprising:
    generating an oxidizing fluid substantially free of nitrogen and sulfur;
    supplying a carbonaceous fuel substantially free of nitrogen and sulfur to a gas generator;
    supplying the oxidizing fluid to the gas generator at a sub-stoichiometric rate relative to the carbonaceous fuel;
    combusting the carbonaceous fuel with the oxidizing fluid in the gas generator to produce a combusted gas;
    discharging the combusted gas to a first power take-off device;
    discharging a first variable portion of the combusted gas to a first catalytic shift reactor;
    discharging a second variable portion of the combusted gas to a first reheater operating at a lower pressure than the gas generator;
    combusting the second variable portion of the combusted gas with the oxidizing fluid in the first reheater to form a reheated gas;
    discharging the reheated gas to a second power take-off device;
    discharging a first variable portion of the reheated gas to a second catalytic shift reactor operating at a lower pressure than the first catalytic shift reactor;
    discharging a second variable portion of the reheated gas to a second reheater operating at a lower pressure than the first reheater;
    combusting the second variable portion of the reheated gas with the oxidizing fluid in the second reheater to form a twice reheated gas;
    discharging the twice reheated gas to a third power take-off device;
    discharging the twice reheated gas to a third catalytic shift reactor operating at a lower pressure than the second catalytic shift reactor; and
    separating the carbon dioxide, hydrogen, and water from the first variable portion of the combusted gas, the first variable portion of the reheated gas, and the twice reheated gas.

18. A method of generating power according to claim 17, wherein said step of supplying the oxidizing fluid to the gas generator comprises supplying the oxidizing fluid to the gas generator at a sub-stoichiometric rate of between 0 and 50 percent relative to the carbonaceous fuel.

19. A method of generating power according to claim 17, further comprising:
    regulating a supply of the oxidizing fluid to the first reheater to a sub-stoichiometric rate higher than the sub-stoichiometric rate of the oxidizing fluid in the gas generator; and regulating a supply of the oxidizing fluid to the second reheater to a sub-stoichiometric rate higher than the sub-stoichiometric rate of the oxidizing fluid in the first reheater.

20. A method of generating power according to claim 17, wherein said step of combusting the carbonaceous fuel with the oxidizing fluid comprises at least partially combusting at least 98 percent of the carbonaceous fuel.

21. A method of generating power according to claim 17, wherein said steps of discharging the combusted gas to a first power take-off device comprises discharging the combusted gas to a first turbine coupled to at least one electric generator, and discharging the reheated gas to a second power take-off device comprises discharging the reheated gas to a second turbine coupled to the at least one electric generator, and further comprising rotating the at least one electric generator to generate electricity.

22. A method of generating power according to claim 17, further comprising discharging at least part of the first variable portion of the combusted gas, the first variable portion of the reheated gas, and the twice reheated gas to a carbon monoxide catalytic reactor to convert carbon monoxide in the gases to methanol and hydrogen.

23. A power generation system, comprising:
a gas generator configured to receive a carbonaceous fuel substantially free of nitrogen and sulfur and an oxidizing fluid substantially free of nitrogen and sulfur and combust the carbonaceous fuel with the oxidizing fluid to produce a combusted gas;
a regulation system configured to regulate the flow of the oxidizing fluid into the gas generator at a sub-stoichiometric rate relative to the carbonaceous fuel;
a first power take-off device configured to receive the combusted gas from the gas generator;
a reheater configured to receive and combust the combusted gas from the first power take-off device and the oxidizing fluid to form a reheated gas; and
a second power take-off device configured to receive the reheated gas from the reheater.

24. A power generation system according to claim 23, further comprising a source of the carbonaceous fuel substantially free of nitrogen and sulfur and a source of the oxidizing fluid substantially free of nitrogen and sulfur, wherein the source of the carbonaceous fuel is configured to supply the carbonaceous fuel to the gas generator and the source of the oxidizing fluid is configured to supply the oxidizing fluid to the gas generator and the reheater.

25. A power generation system according to claim 23, further comprising at least one generator coupled to the first and second power take-off devices.

26. A power generation system according to claim 23, further comprising an air separation plant for producing the oxidizing fluid from air.

27. A power generation system according to claim 23, wherein the carbonaceous fuel is methane.

28. A power generation system according to claim 23, wherein the gas generator is capable of at least partially combusting at least about 98 percent of the carbonaceous fuel.

29. A power generation system according to claim 23, wherein the first and second power take-off devices are turbines.

30. A power generation system according to claim 23, further comprising a regulation system configured to regulate the flow of the oxidizing fluid into the reheater at a stoichiometric rate relative to the carbonaceous fuel.

31. A power generation system according to claim 23, wherein the reheater is capable of heating the combusted gas to at least 2000° F.

32. A power generation system according to claim 23, wherein the reheated gas comprises carbon dioxide, between about 3 and 10 percent hydrogen by volume, between about 1 and 3 percent carbon monoxide by volume, and substantially free of nitrogen and sulfur.

33. A power generation system according to claim 23, wherein the reheater comprises a partial catalytic bed to facilitate the reaction of hydrogen in the combusted gas with oxygen.

34. A power generation system according to claim 23, further comprising:
a catalytic shift reactor configured to receive the reheated gas from the second power take-off device.

35. A power generation system according to claim 23, further comprising:
at least one condenser and at least one compressor configured to receive the reheated gas from the second power take-off device.

36. A power generation system according to claim 23, further comprising:
a separator configured to receive the reheated gas from the second power take-off device and capable of separating carbon dioxide from the reheated gas.

37. A power generation system according to claim 36, wherein the separator is configured to receive cryogenic nitrogen from the air separation plant.

38. A power generation system according to claim 23, further comprising a carbon monoxide catalytic converter configured to receive the reheated gas from the second power take-off device.

39. A power generation system according to claim 23, further comprising:
a catalytic shift reactor configured to receive a variable portion of the combusted gas from the first power take-off device, and wherein the catalytic shift reactor is capable of converting the variable portion of the combusted gas to hydrogen and carbon dioxide.

40. A power generation system according to claim 39, further comprising:
a separator configured to receive the variable portion of the combusted gas from the catalytic shift reactor and capable of separating carbon dioxide from the variable portion of the combusted gas.

41. A power generation system according to claim 23, further comprising:
a low pressure reheater configured to receive and combust a variable portion of the reheated gas from the second power take-off device to form a twice reheated gas and discharge the twice reheated gas to a third power take-off device.

42. A power generation system, comprising:
a gas generator configured to receive a carbonaceous fuel substantially free of nitrogen and sulfur, receive an oxidizing fluid substantially free of nitrogen and sulfur, and combust the carbonaceous fuel with the oxidizing fluid to produce a combusted gas;
a regulation system configured to regulate the flow of the oxidizing fluid into the gas generator at a stoichiometric rate relative to the carbonaceous fuel;
a first power take-off device configured to receive the combusted gas from the gas generator;

a first catalytic shift reactor configured to receive a first variable portion of the combusted gas from the first power take-off device;

a first reheater configured to receive and combust a second variable portion of the combusted gas from the first power take-off device with the oxidizing fluid to form a reheated gas;

a second power take-off device configured to receive the reheated gas from the first reheater;

a second catalytic shift reactor configured to receive a first variable portion of the reheated gas from the second power take-off device;

a second reheater configured to receive and combust a second variable portion of the reheated gas from the second power take-off device with the oxidizing fluid to form a twice reheated gas;

a third power take-off device configured to receive the twice reheated gas from the second reheater;

a third catalytic shift reactor configured to receive the twice reheated gas from the third power take-off device; and at least one separator, configured to receive the first variable portion of the combusted gas, the first variable portion of the reheated gas, and the twice reheated gas and capable of separating carbon dioxide, hydrogen, and water from the combusted gas, the first variable portion of the reheated gas, and the twice reheated gas.

43. A power generation system according to claim 42, further comprising a source of the carbonaceous fuel substantially free of nitrogen and sulfur and a source of the oxidizing fluid substantially free of nitrogen and sulfur, wherein the source of the carbonaceous fuel is configured to supply the carbonaceous fuel to the gas generator and the source of the oxidizing fluid is configured to supply the oxidizing fluid to the gas generator, the first reheater, and the second reheater.

44. A power generation system according to claim 42, further comprising at least one generator coupled to the first, second, and third power take-off devices.

* * * * *